United States Patent [19]

Ozawa et al.

[11] 4,208,671
[45] Jun. 17, 1980

[54] COLOR VIDEO RECORDER/REPRODUCER

[75] Inventors: Keiji Ozawa; Hisao Kinjo, both of Yokohama, Japan

[73] Assignee: Victor Company of Japan, Ltd., Yokohama, Japan

[21] Appl. No.: 884,143

[22] Filed: Mar. 7, 1978

[30] Foreign Application Priority Data

Mar. 8, 1977 [JP] Japan ............................... 52-25262

[51] Int. Cl.² ............................................. H04N 5/76
[52] U.S. Cl. .................................. 358/4; 358/128.5; 360/19
[58] Field of Search ........................... 360/33, 19, 77; 358/127, 4, 8

[56] References Cited

U.S. PATENT DOCUMENTS

| 3,872,497 | 3/1975 | Amery | 358/4 |
| 3,969,756 | 7/1976 | Palmer | 360/33 |
| 4,055,848 | 10/1977 | Fearnside | 358/4 |
| 4,056,832 | 11/1977 | Boer | 360/77 |

*Primary Examiner*—James W. Moffitt
*Assistant Examiner*—Alan Faber

[57] ABSTRACT

An information signal recording system separates a color video signal into a luminance signal and a carrier chrominance signal. The frequency of the separated carrier chrominance signal is converted to a lower frequency band. A carrier is frequency modulated with at least one audio signal which is mixed with the separated luminance signal and the frequency converted carrier chrominance signal. A carrier is frequency modulated with the mixed signals, and recorded as a main information signal on a main information signal track of a recording medium. A system for reproducing the recording medium reproduces the recorded main information signal from the recording medium. The reproduced main information signal is frequency demodulated, and the resulting output signal is separated into the luminance signal and the frequency converted carrier chrominance signal. The converted carrier chrominance signal is returned to the original frequency and mixed with the separated luminance signal to produce a reproduced color video signal. The frequency modulated audio signal is separated from the frequency demodulated main information signal. The separated frequency modulated audio signal is then demodulated.

8 Claims, 12 Drawing Figures

COLOR VIDEO RECORDER/REPRODUCER

BACKGROUND OF THE INVENTION

The present invention relates generally to systems for recording information signals on recording mediums and systems for reproducing the recorded signals from the recording mediums. More particularly, the invention relates to a system for recording a main information signal on a rotary recording medium. This main signal includes a video signal and an audio signal together with reference signals the frequencies of which are selected so that beat disturbance will not occur. The invention also relates to systems for reproducing these signals from the recording medium.

Known systems heretofore recorded reproduced information signals such as video signals and/or audio signals on and from disc-shaped, rotary mediums (referred to hereinafter simply as "discs"). These known systems are broadly divided into systems in which reproduction is carried out optically, systems in which reproduction is carried out by means of a reproducing stylus employing a piezoelectric element, and systems in which reproduction is carried out by utilizing variations in the electrostatic capacitance between an electrode on a reproducing stylus and the recorded surface of the disc.

We have considered the advantages and disadvantages of these three kinds of systems and have adopted the electrostatic capacitance system as being the most desirable. Further, we have previously described a new system for overcoming the problems accompanying known electrostatic capacitance system. Please see copending application entitled "Information signal recording system", U.S. patent application Ser. No. 785,095, filed Apr. 6, 1977.

More specifically, in accordance with a known electrostatic capacitance system, recording is accomplished by forming a spiral guide groove in the disc for guiding the reproducing stylus. At the same time, pits are formed responsive to and in correspondence with an information signal to be recorded on the bottom surface of the groove. In the reproducing system, the reproducing stylus, is guided by the guide groove. It traces the track within the groove and reproduces the recorded signal in response to variations in the electrostatic capacitance.

In this known system however, a reproducing stylus guiding groove is provided in the disc. The reproducing stylus is compulsorily guided by this groove. It is not possible for the reproducing stylus to do such things as riding over the groove wall of one track, moving into another track, and then returning to the original track. If the reproducing stylus were to be forced to undergo such an operation, the groove and the stylus would be damaged. For this reason, it has not been possible in this known system to carry out quick-motion picture reproduction, slow-motion picture reproduction, still-picture reproduction, and the like.

Futhermore, since the contact area between the tip of the reproducing stylus and the guide groove of the disc is small, the stylus wears excessively. When the width of the stylus tip reaches the groove width as a result of abrasive wear, the serviceable life of this reproducing stylus ends. Thus, this system is accompanied by the problem of a short life for the reproducing stylus. Another problem is that fine chip particles are abraded from the disc by the tracing action of the reproducing stylus along the guide groove. These chips give rise to difficulties which further promote wear and damage of the stylus and the guide groove. As a result, there is an increase of the gap between the electrode at the stylus tip and the recorded surface including the pits within the disc guide groove. The reproduced output decreases because of spacing loss.

If a low rotationsl disc speed (such as 450 rpm.) is used value such as 450 rpm., for example, in order to prolong the life of the stylus tip, the recording wavelength of the information signal recorded in the guide groove will become short. For this reason, a low price recording apparatus using a laser light cannot be employed in the recording system. The disadvantageous result is that a high price recording apparatus must use an electron beam.

Accordingly, to overcome the various problems of the known systems described above, the aforecited patent application describes a novel system for recording and reproducing information signals. According to the recording in this system, pits are formed in accordance with the information signal being recorded along a spiral track on a recording medium of flat disc shape, without forming a groove therein. In the reproducing system, a reproducing stylus traces over and along this track to reproduce the recorded information signal. In this system, pilot or reference signals are recorded on or in the vicinity of a track of the information signal such as video signal on a rotary disc. At the time of reproducing, the reference signals are reproduced together with the video signal. Tracking servo control is carried out so that the reproducing stylus traces accurately along the track in response to the reproduced reference signals.

By the use of this previous system, the recording track has no groove. There is no possibility whatsoever of the reproducing stylus or the recording medium being damaged. The stylus can trace the same portion of the track repeatedly many times. Therefore, special reproduction such as still, slow motion, or quick motion reproduction becomes possible. Furthermore, other difficulties of the known system are removed.

If a video signal and an audio signal are to be recorded as the main information signal, it is desirable to record the video signal and the audio signal on the same track for effective utilization of the recording capacity of the recording medium. Accordingly, known recording systems use a duty-cycle modulation system. A frequency-modulated audio signal obtained by frequency modulating a carrier wave with an audio signal is superimposed on a frequency-modulated video signal obtained by frequency modulating a carrier wave with a video signal. The duty cycle of the carrier wave of the frequency-modulated video signal is modulated by the carrier wave of the frequency-modulated audio signal.

In this system, however, distortion in the signal transmission system is great. Cross-modulation distortion arises between the frequency-modulated video signal and the frequency-modulated audio signal. As a result, beat disturbance occurs in the demodulated video signal. For reducing this beat disturbance, the level of the frequency-modulated audio signal is lowered relative to the frequency-modulated video signal. However, this is not desirable since it gives rise to a lowering of the S/N ratio of the demodulated audio signal.

Furthermore, if a color video signal and an audio signal are recorded on the same track, one conceivable method begins by separating the color video signal into a luminance signal and a chrominance signal. The frequency-modulated audio signal and the separated luminance signal are mixed. Then a carrier wave is frequency modulated with the resulting mixed signal. The system mixes and records the resulting frequency-modulated signal. A signal is obtained by frequency converting the separated chrominance signal to a band which is lower than the frequency-modulated luminance signal. By this method, however, the chrominance signal which has been frequency converted to a lower frequency band is not frequency modulated. This chrominance signal cannot be passed through an amplitude limiter in the reproducing system. There is a problem of its readily being affected by level fluctuation.

On the other hand, if pilot signals are recorded in correspondence with the horizontal blanking periods of the video signal in the aforedescribed system, the pilot signals have no disturbing effect whatsoever on the video signal. However, the pilot signals may be used for tracking control of the reproducing transducer and also for correction control of time-axis error (jitter) of the reproduced signal. The pilot signals may also be used for arm-stretcher control by which the position of a reproducing transducer is controlled in its longitudinal direction along the track. The pilot signals are recorded in correspondence with all periods of the video signal. In this case, it is conceivable that the pilot signals may impart a beat disturbance to the video signal. Therefore, there is a necessity for preventing deleterious effects on the video signal even when the pilot signals are recorded over all periods of the video signal.

SUMMARY OF THE INVENTION

Accordingly, it is a general object of the present invention to provide a novel and useful system for recording and reproducing information signals on and from a recording medium. Here, an object is to overcome the above described difficulties which are encountered in the known systems.

Another and specific object of the invention is to provide a system capable of recording on and reproducing from the same track a plurality of main information signals with little beat disturbance. Then information signals may be, for example, a video signal and an audio signal. An object is to avoid such disturbance even when there is great distortion in the signal transmission system.

Still another object of the invention is to provide a system capable of recording and reproducing pilot signals without producing beat disturbance with respect to the above mentioned video signal.

Other objects and further features of the invention will be apparent from the following detailed description when read in conjunction with the accompanying drawings.

DETAILED DESCRIPTION

Figure 1:
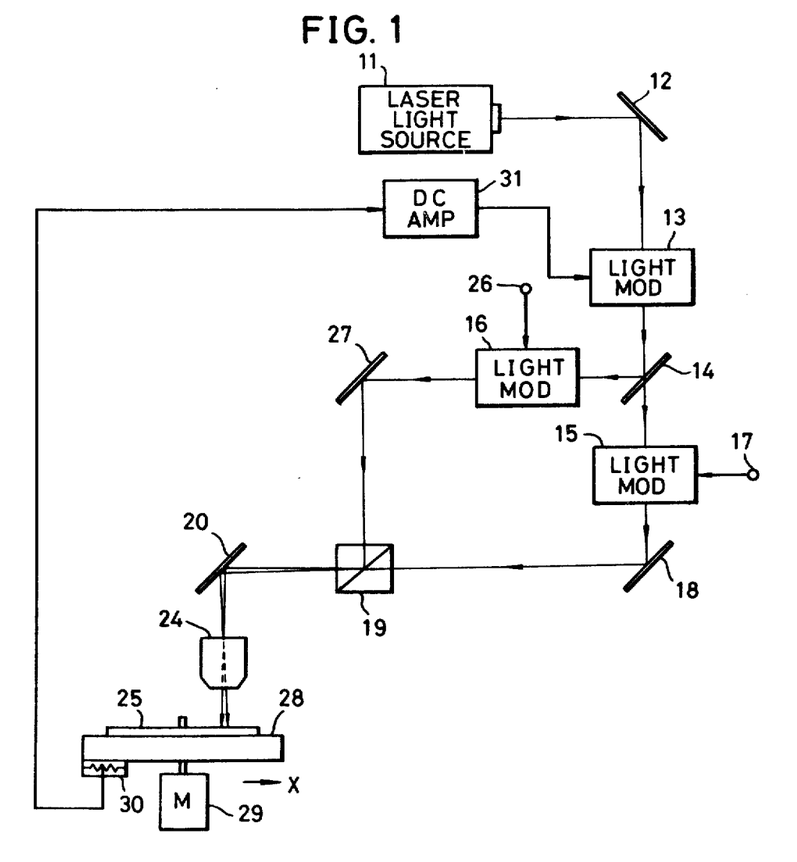
FIG. 1 is a block diagram of one example of a recording apparatus by which the system of the invention can be reduced to practice.

FIG. 1 shows one example of the apparatus for recording a signal on a rotating recording medium. A laser light beam is emitted from a laser light source 11 and is reflected by mirror 12 through a light modulator 13 for light quantity adjustment. The light beam thus adjusted is projected onto a half mirror 14, which transmits one part of the light to a light modulator 15 and reflects another part thereof to another light modulator 16.

A main information signal is obtained from a circuit which will be described hereinafter. This signal is supplied through an input terminal 17 to the light modulator 15 which modulates the light beam transmitted through the half mirror 14. The resulting output is projected as a first modulated light beam onto a mirror 18, by which it is reflected. It passes through a polarizing prism 19. The light transmitted through the prism 19 is reflected by a mirror 20 through an objective lens 24. There it is brought to a focus on a photosensitive agent coating an original recording disc 25 made of material such as glass.

On the other hand, reference signals are obtained from the circuit which will be described hereinafter. These signals are supplied through an input terminal 26 to the light modulator 16.

The light beam reflected by the half mirror 14 is modulated in the light modulator 16 by the pilot signals. Mirror 27 reflects the resulting output, as a second modulated light beam, into the polarizing prism 19, where its polarization plane is angularly shifted by 90 degrees from that of the first modulated light beam. Leaving the polarizing prism 19, the first and second modulated light beams are reflected by the mirror 20 through the objective lens 24, and are focused on the original recording disc 25.

The original disc 25 is mounted on a turntable 28, and is rotated at a rotational speed of, for example 900 rpm., by a motor 29. The original disc 25, turntable 28, and motor 29 are unitarily and continuously transported at a specific pitch in the arrow direction X by a transporting mechanism (not shown). As a result, the first and second modulated light beams record the main information signal and the pilot signals along a spiral track on the original disc, the track extending from an outer periphery of the disc toward its center.

Furthermore, a displacement position detector 30 (comprising a potentiometer) detects the displacement position due to the transporting movement as the original disc 25 and the turntable 28 are transported in the arrow direction X. The potentiometer produces a DC voltage responsive to the displacement position. This DC voltage is passed through a DC amplifier 31 to the light modulator 13 for light quantity adjustment. The intensity of the light beam from the laser light source 11 is controlled in response to the position, in the radial direction of the original disc 25, of the light beam spot focused on the disc 25. By this arrangement and operation of the recording apparatus, compensation eliminates the effect of the difference in linear speed due to the position of the light beam spot in the radial direction of the original disc 25.

The original disc 25 is exposed to light, subject to a known developing process and to a known disc fabricating process, whereupon a completed recorded disc is obtained. The recorded disc comprises, for example, a disc substrate made of polyvinyl acetate (PVAC), in which the pits are formed in the spiral track. A metal coating is formed over the substrate with a thickness of 400 Å, for example, to constitute an electrode. A dielectric coating film of a thickness of 400 Å is adhered onto the metal coating. The disc may be given an electrode function by using another material instead of a metal coating film.

It is to be observed that an electron beam may be used in place of a laser light beam. Furthermore, instead of the arrangement wherein the original disc, turntable 28, and motor 29 are transported in the arrow direction X, an arrangement may be provided wherein an optical system for projecting the light beams onto the original disc 25 is transported in the direction opposite to the arrow direction X.

Figure 2:
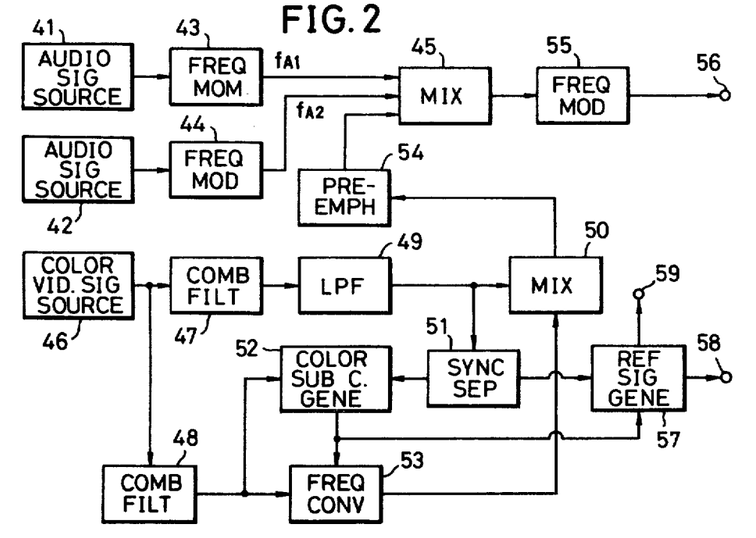
FIG. 2 is a block diagram of one embodiment of the recording system of the invention.

FIG. 2 shows one embodiment of an essential part of the recording system of the invention for forming signals supplied to the input terminals 17 and 26.

The stereo audio signals of two-channels are supplied from audio signal sources 41 and 42 to frequency modulators 43 and 44. There, they frequency modulate carrier waves respectively of frequencies of 3.43 MHz and 3.73 MHz, for example. The resulting frequency-modulated audio signals fA1 and fA2 have frequency deviations of 3.43 MHz±75 KHz and 3.73 MHz±75 KHz and are supplied to a mixer 45.

Figure 4A:
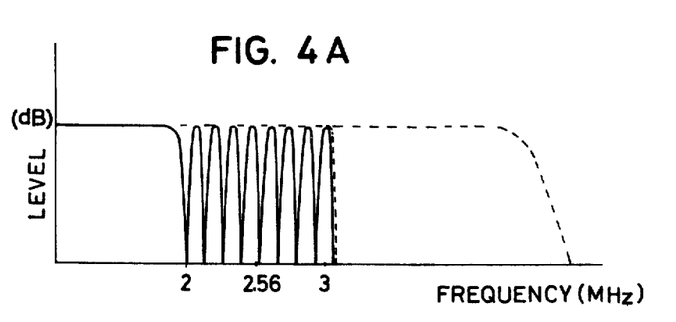
FIGS. 4A, 4B, and 4C are respectively graphs indicating the frequency spectrum of signals at various parts of the block diagram of the system illustrated in FIG. 2.

On the other hand, an NTSC color video signal, for example, is supplied from a color video signal source 46 to each of two comb filters 47 and 48. The comb filter 47 operates with respect to signals in a frequency band higher than 2 MHz and separates a luminance signal, which is supplied to a low-pass filter 49. This low-pass filter 49 band limits the upper frequency of the luminance signal to approximately 3 MHz. The resulting output luminance signal has a frequency spectrum shown in FIG. 4A, and is supplied to a mixer 50 and to a synchronizing signal separation circuit 51. The circuit 51 separates a synchronizing signal from the luminance signal.

Figure 4B:
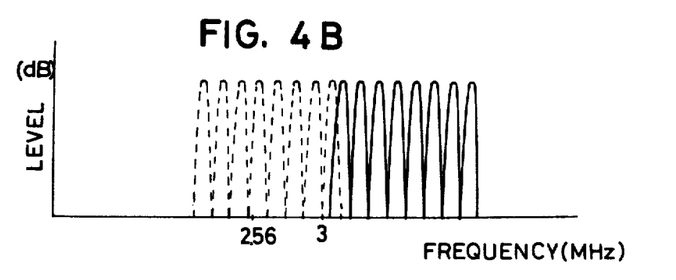

The comb filter 48 produces a carrier chrominance signal having a frequency spectrum shown in a full line in FIG. 4B. A frequency band of 3.58 MHz±500 KHz is supplied to a color sub-carrier generating circuit 52 and to a frequency converting circuit 53. The color sub-carrier generating circuit 52, which is known, generates a continuous wave of a frequency fsc (3.579545 MHz in the case of a NTSC system color video signal). The frequency fsc is equal to the color sub-carrier frequency of the carrier chrominance signal, and is generated from a color burst signal in the carrier chrominance signal from the comb filter 48. The signal uses a burst gate pulse signal formed from the synchronizing signal from the synchronizing signal separation circuit 51.

The frequency converting circuit 53 frequency demultiplies and frequency multiplies the signal of the frequency fsc from the color sub-carrier generating circuit 52. This obtains a signal of a frequency of 12/7 fsc and beat converts this signal and the input carrier chrominance signal. As a result, the frequency converting circuit 53 produces a carrier chrominance signal which results from the frequency conversion of the color sub-carrier frequency to low band of 5/7 fsc (approximately 2.56 MHz) and a frequency spectrum shown in an intermittent line in FIG. 4B.

This low-band converted carrier chrominance signal is supplied to the mixer 50. There it is multiplexed and inserted, in a common band frequency band near the upper limit frequency of the luminance signal, with the luminance signal shown in FIG. 4A. The luminance signal is obtained from the comb filter 47 and band limited by the low-pass filter 49. This multiplexed signal passes through a pre-emphasis circuit 54 to the mixer 45. There it is mixed at a suitable level ratio with the frequency-modulated audio signals fA1 and fA2.

In this connection, the carrier frequencies of these frequency-modulated audio signals fA1 and fA2 have values higher than the upper-limit frequency (3 MHz) of the luminance signal band. There will be no overlapping of bands with the luminance signal which has been separated and band limited. Here, it is desirable that these carrier frequencies be of values which are not very high. For example, they may be in the order of 3 to 4 MHz, because of considerations such as relationships with the other recorded and reproduced signals and the facility of recording and reproducing.

The output mixed signal of the mixer 45 is supplied to a frequency modulator 55, where it frequency modulates a carrier. Here, this frequency modulation is carried out so that, for example, the synchronizing signal tip (sync. tip) of the video signal will be 6.0 MHz, the pedestal will be 6.7 MHz, and the white peak will be 8.3 MHz. The output frequency-modulated signal of this frequency modulator 55 is led out as a main information signal through an output terminal 56. It is supplied to the input terminal 17 of the system shown in FIG. 1 and then recorded on a main information signal track of the disc 25.

Thus, in the system of the present invention, the known duty-cycle modulation system is not used. A single carrier is frequency modulated by signals such as a luminance signal, a carrier chrominance signal, and a frequency-modulated audio signal. For this reason, cross-modulation distortion does not occur in the reproduced demodulated video signal, even when there is great distortion in the recorded and reproduced signal transmission system. Therefore, beat disturbance does not arise. A color video signal and an audio signal can be recorded on the same single track.

On the other hand, a pilot signal generating circuit 57 is supplied with a synchronizing signal from the synchronizing signal separation circuit 51 and the color sub-carrier signal of the frequency fsc from the color sub-carrier generating circuit 52. Circuit 57 produces first, second, and third pilot signals $fp_1$, $fp_2$, and $fp_3$, as described hereinafter. These pilot signals are led out through an output terminal 58 and supplied to the input terminal 26 of the system shown in FIG. 1.

The third pilot signal $fp_3$ may be led out through another output terminal 59, and supplied to the input terminal 17 (FIG. 1) together with the main information signal from the output terminal 56. The third pilot signal $fp_3$ is thus recorded on the main information signal track, as described hereinafter.

Figure 3:
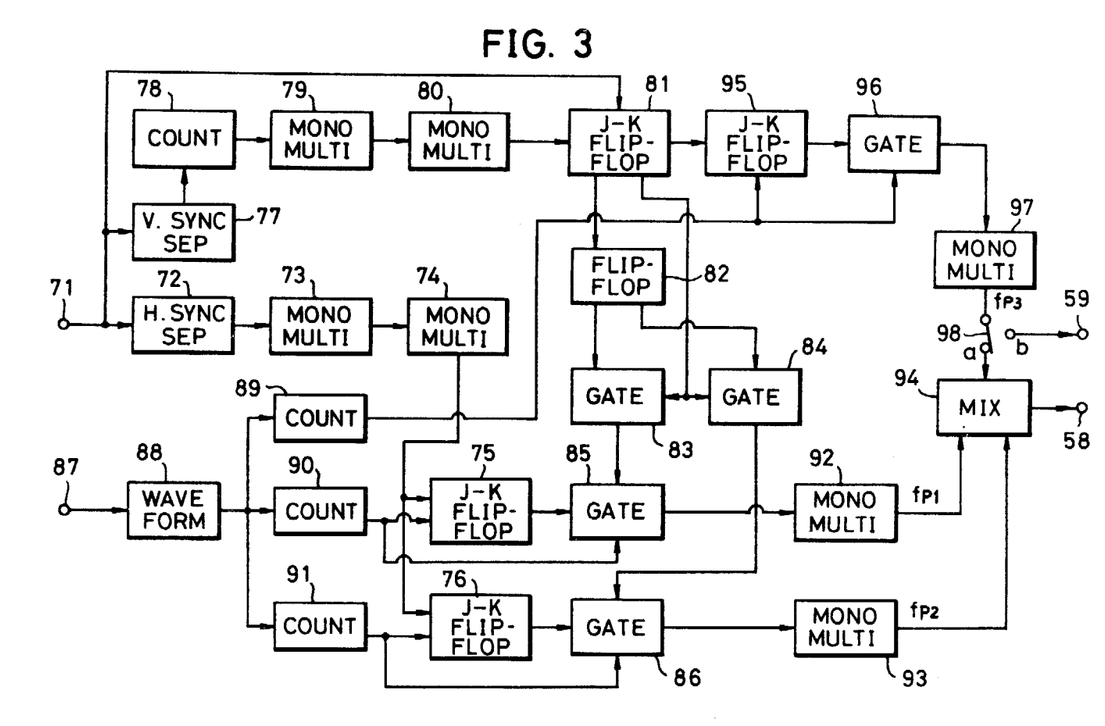
FIG. 3 is a block diagram, in greater detail, showing one part of the system shown in FIG. 2.

A detailed block system of one embodiment of the inventive pilot signal generating circuit 57 will now be described in conjunction with FIG. 3. The synchronizing signal from the synchronizing signal separation circuit 51 is applied through an input terminal 71 to a horizontal synchronizing signal separation circuit 72, to a vertical synchronizing signal separation circuit 77, and to a J-K flip-flop circuit 81. The horizontal synchronizing signal separated by the separation circuit 72 is applied as a trigger pulse to a monostable multivibrator 73. The output of circuit 73 is applied as a trigger pulse to another monostable multivibrator 74. As a result, the monostable multivibrator 73 adjusts a pulse signal to a suitable position and the monostable multivibrator 74 gives the pulse a suitable width. The resulting pulse is supplied from the monostable multivibrator 74 to J-K flip-flop circuits 75 and 76.

The vertical synchronizing signal which has been separated by the circuit 77 is passed through a counter 78, where its frequency is counted down to ½ and thus frequency divided. The pulse is then supplied as a trigger pulse to a monostable multivibrator 79. This monostable multivibrator 79 thereupon produces an output which triggers another monostable multivibrator 80. This produces an output pulse signal which has been adjusted to a suitable position and a suitable width, respectively, by the monostable multivibrators 79 and 80. The Q and $\overline{Q}$ output pulses of the monostable multivibrator 80 are supplied to input terminals J and K of J-K flip-flop circuit 81. The position of this output pulse is adjusted to be within the vertical blanking period such as the equalizing pulse position immediately after the vertical synchronizing signal. The output pulse width has a value in the order of 1 H (where H is the horizontal scanning period) to a multiple of H.

The J-K flip-flop circuit 30 is operated by a synchronizing signal applied as a clock pulse through the input terminal 71 to re-synchronize the output signal of the monostable multivibrator 80. The resulting output of the J-K flip-flop circuit 81 is supplied to a flip-flop circuit 82, to gate circuits 83 and 84, and to a J-K flip-flop circuit 95. The flip-flop circuit 82 counts down its input signal and produces a rectangular output wave which repeats a logical "0" and "1", with a period or a duration corresponding to four fields of the video signal. This rectangular output wave is applied as gate pulses of mutually opposite phase respectively to the gate circuits 83 and 84. The pulse part of the output from the J-K flip-flop circuit 81 is a gate output.

A continuous wave signal, of the frequency fsc, is produced by the color sub-carrier generating circuit 52 and is supplied through an input terminal 87 to a waveform shaping circuit 88. There it is formed into a rectangular wave. The resulting rectangular output wave is counted down respectively to 1/13, 1/5, and 1/7, and thus frequency divided by counters 89, 90, and 91. In this case, the output signals of the counters 89, 90, and 91 have a frequency-interleaving relationship to the frequency fH of the horizontal synchronizing signal. The frequencies 511.36357 KHz (=3.579545 MHz×1/7) and 715.909 KHz (=3.579545 MHz×1/5) are obtained respectively from the counters 90 and 91 and are applied as clock pulses respectively to the J-K flip-flop circuits 75 and 76. The Q and $\overline{Q}$ output signals of the monostable multivibrator 74 are applied to the J and K input terminals of the flip-flop circuits 75 and 76. As a result, the output of the monostable multivibrator 74 is re-synchronized by the outputs of the counters 90 and 91 and is supplied to gate circuits 85 and 86. In this case, the output signals of the counters 90 and 91 have a frequency-interleaving relationship to the horizontal synchronizing signal. They also have varying phases relative to the output of the monostable multivibrator 74. For this reason, the J-K flip-flop circuits 75 and 76 are used for resynchronization.

The outputs of the gate circuits 83 and 84 and the outputs of the counters 90 and 91 are further supplied to the gate circuits 85 and 86. As a result, pulses are obtained with a 4-field period from these gate circuits 85 and 86, during the horizontal blanking intervals, exclusive of the output width intervals of the J-K flip-flop circuit 81. The outputs of the gate circuits 85 and 86 are applied as trigger pulses to monostable multivibrators 92 and 93. From them, first and second pilot signals are obtained at the frequencies 715.909 KHz and 511.36357 KHz, with a duty cycle of 50 percent. They are respectively supplied to a mixer 94.

The Q and $\overline{Q}$ outputs of the J-K flip-flop circuit 81 are applied to the J and K input terminals of the J-K flip-flop circuit 95. The counter 89 produces a signal at a frequency of 275.3496 KHz (=3.579545 MHz×1/313) which is applied as a clock pulse. A gate circuit 96 receives the output pulse of the J-K flip-flop circuit 95 as a gate pulse and thereby gates the signal from the counter 89. The resulting output of the gate circuit 96 triggers a monostable multivibrator 96, which thereupon produces the third pilot signal $fp_3$ at a frequency of 275.3496 KHz and with a duty cycle of 50 percent. This third pilot signal $fp_3$ passes through a switch 98, whose moving contact is connected to the side of its fixed contact a, and is supplied to the mixer 94.

The first, second, and third pilot signals $fp_1$, $fp_2$, and $fp_3$ are mixed in the mixer 94. The resulting output is led out through the output terminal 58 to the input terminal 26 of the system in FIG. 1. Since the first, second, and third pilot signals are obtained by counting down the color sub-carrier in this manner, the frequency and the phase are stable.

Since the third pilot signal $fp_3$ exists in only the vertical blanking interval, it may be recorded on the track of the main information signals. Therefore, if it is thus recorded, the moving contact of the switch 98 is connected to the fixed contact b. The third pilot signal is led out through the terminal 59 to the input terminal 17 of the system shown in FIG. 1.

In the above described embodiment of the invention, the first and second pilot signals exist only during intervals corresponding to the horizontal blanking intervals. However, these pilot signals are respectively set by the counters 89, 90, and 91 at the frequencies which are odd-number multiples of ½ of the horizontal scanning frequency fH. They have a frequency-interleaving relationship to the horizontal synchronizing signal. Their frequency bands differ from that of the carrier chrominance signal which has been converted to a low band. For this reason, it is possible to continuously record the pilot signals $fp_1$ and $fp_2$, at a high level so as to obtain a satisfactory S/N ratio. The high level is taken in correspondence with the entire duration of the video signal. The accuracy and stability of the tracking control of the reproducing transducer can be improved continuously by using the reproduced pilot signals. Furthermore, these reproduced pilot signals can be used continuously to control the time-axis error (jitter).

Figure 4C:
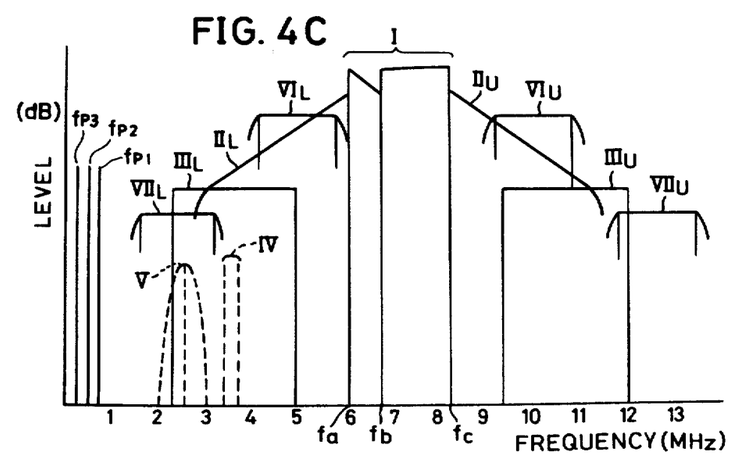

One example of a frequency spectrum of main information signals and pilot signals which are recorded in the manner described above is indicated in FIG. 4. In this frequency spectrum, the zone I indicates a carrier frequency deviation band having a band width of 2.3 MHz of the frequency-modulated luminance signal. The frequencies fa, fb, and fc respectively indicate the frequencies of a 6 MHz corresponding to the tip of the synchronizing signal, 6.7 MHz corresponding to the pedestal, and 8.3 MHz corresponding to the white peak of the video signal. The zones $II_L$ and $II_U$ respectively indicate the lower side band and the upper side band of the frequency-modulated luminance signal. The zones $III_L$ and $III_U$ respectively indicate the lower side band and the upper side band of signals obtained when the frequency-modulated audio signals $f_{A1}$ and $f_{A2}$ are further frequency modulated. As described hereinbefore, the frequency modulated audio signals $f_{A1}$ and $f_{A2}$ are obtained by frequency modulating carriers of frequencies of 3.43 MHz and 3.73 MHz with an audio signal. These signals are indicated by the zone IV which has a band that is higher than the luminance signal having the upper limit frequency of 3 MHz. The zone V indicates the band of the carrier chrominance signal converted to a low frequency band and is a band of 2.5568 MHz $(=(5/7)fsc)\pm 500$ KHz. First side bands and second side bands are produced by the frequency modulation of this carrier chrominance signal converted to a low band. These side bands are indicated respectively by the zones $VI_L$ and $VI_U$ and the zones $VII_L$ and $VII_U$. The pilot signals $fp_1$, $fp_2$, and $fp_3$ are in a band lower than the bands of these main information signals. The frequency spectrum indicated by full lines in FIG. 4 is the spectrum of signals which are actually recorded.

Figures 5A, 5B:
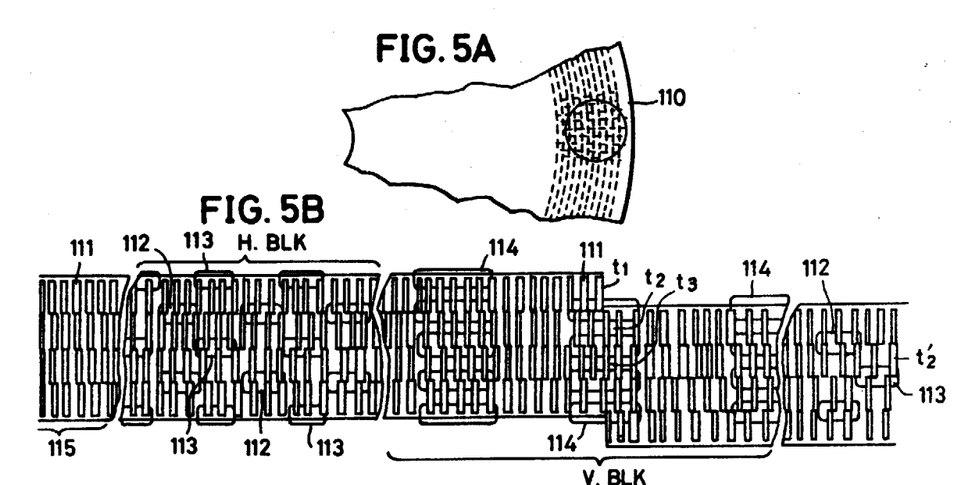
FIGS. 5A and 5B are fragmentary plan views showing portions of a track pattern on a rotary recording medium on which signals have been recorded by the recording apparatus shown in FIG. 1.

FIGS. 5A and 5B show one embodiment of the invention disc produced by the recording apparatus illustrated in FIG. 1. In FIG. 5A, the recorded disc 110 has a spiral track formed thereon. One portion of the circular disc shape is shown enlarged in FIG. 5B. In FIG. 5B, the successive track turns, of the single continuous spiral shape, are respectively designated as $t_1$, $t_2$, $t_3$ . . . Each track turn is constituted by the formation of pits 111 responsive to the main information signal along the track path. With respect to one track turn $t_1$, every period H is shown at a position (H.BLK), corresponding to the horizontal blanking period. Pits 112 of the first pilot signal $fp_1$ are formed on one lateral side of the track as viewed in the track path direction (for example, on the right hand side in the direction of rotation). Pits 113 of the second pilot signal $fp_2$ are formed on the other side (left hand side) of the track. With respect to the adjacent track $t_2$, the pits 113 of the second pilot signal $fp_2$ are formed on one side (right hand side) as viewed in the track path direction. The pilot signal is recorded at a position corresponding to the horizontal blanking period in every period H. On the other side (left hand side), the pits 112 are formed responsive to the first pilot signal $fp_1$. Thus, the positions at which the pits 112 and the pits 113 of the first and second pilot signals $fp_1$ and $fp_2$ are formed are alternately reversed in the disc radial direction.

In addition, pits 114 of the third pilot signal $fp_3$ are formed in the position (V.BLK) corresponding to the vertical blanking period, coinciding with the parts where the track turn designation numbers change.

In the embodiment of the invention, the pilot signal pits 112 and 113 are formed at only the position H.BLK within one H period. They are not formed at other parts 115, but the pit 112 and 113 also may be formed in these parts 115. The surface is planar on those parts of the disc 110 in which pits are not formed and they do not have a guide groove.

In the present embodiment of the invention, the pits 111 are so formed that one of the edge lines of each track is substantially coincident with the nearest edge line of the adjacent track. That is, the adjacent tracks $t_1$, $t_2$, $t_3$, . . . are so formed that they are successively contiguous. Accordingly, the track pitch TP is substantially equal to the track width TW. At central positions approximately intermediate between the centerlines of the mutually adjacent tracks, pilot signal pits 112 and 113 are formed and overlapped on two tracks adjacent each other.

Figure 6:
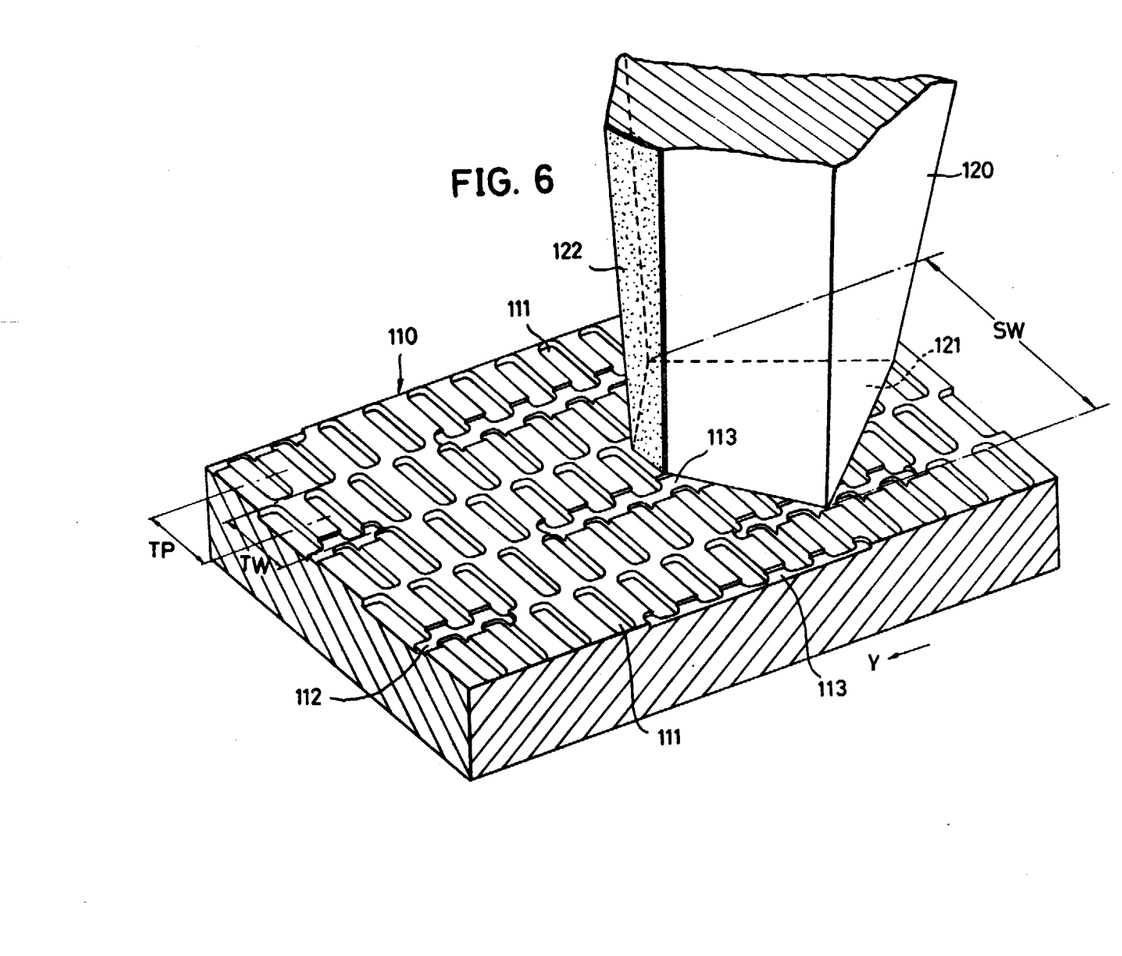
FIG. 6 is a greatly enlarged perspective view showing the tracking of a reproducing stylus on a rotary recording medium.

FIG. 6 shows a reproducing stylus 120 tracing a track recorded on the disc 110, having the above described pit arrangement. Only the bottom face 121 of the stylus 120 and the bottom face of an electrode 122 are shown. The bottom face 121 of the stylus has a part with maximum width SW, which is greater than the track pitch TP of the disc 110. An electrode 122 has a thickness of 500–3000 Å and is fixed to the rear face of the stylus at the rear edge of the bottom face 121. As the disc 110 rotates in the arrow direction Y, the reproducing stylus 120 traces along the surface of the disc 110. The electrostatic capacitance between the electrode 122 and an electroconductive layer covering the entire surface of the disc varies in response to the pits 111. The main information signal recorded by the pits 111 is thus reproduced.

At the same time, the electrode 122 also reproduces the pilot signals of frequencies $fp_1$ and $fp_2$ recorded by the pits 112 and 113. If the center of the electrode 122 deviates from the centerline of the track, a level difference occurs in the reproduced pilot signals. The tracking servo operation is carried out by a circuit to be described hereinafter.

Figure 7:
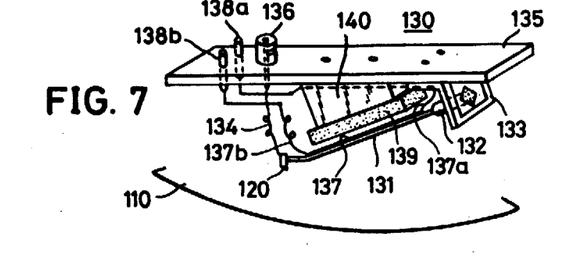
FIG. 7 is a perspective view of one example of a reproducing transducer.

The reproducing transducer 130 has an arrangement as shown in FIG. 7, for example. A cantilever 131 has a reproducing stylus 120 mounted at its free end. At its opposite end the cantilever 131 is connected via a damper 132 to a bracket 133. The electrode of the reproducing stylus 120 is connected through a very thin lead wire 134 which is flexible and slackened to a terminal 136 on the support plate 135. A very thin gold wire 137 is bonded, except at its ends, to the cantilever 131 over a specific distance along the longitudinal direction. Lead wire parts 137a and 137b at the ends of this gold wire 137 are respectively connected in a slackened state to terminals 138a and 138b on the support plate 135. A permanent magnet 139 is secured by way of a bracket 140 to the lower surface of the support plate 135. The wire 137 is thus disposed in this strong magnetic field formed by the magnet 139.

The tracking control signal is supplied between the terminals 138a and 138b. When the control signal current flows through the terminals 138a and 138b and through the wire 137, a displacement force acts on the wire 137 in the transverse direction perpendicular to the longitudinal direction of the cantilever 131. This signal is in response to the current, according to the Fleming's left-hand rule, since the wire 137 is disposed within the field of the magnet 139. The cantilever 131 is displaced by the force acting on the wire 137 bonded thereto. As a result, the reproducing stylus 120 is displaced in a direction perpendicular to the longitudinal direction of the track. Tracking control is so accomplished that the reproducing stylus 120 traces accurately along the track.

Figures 8, 9:
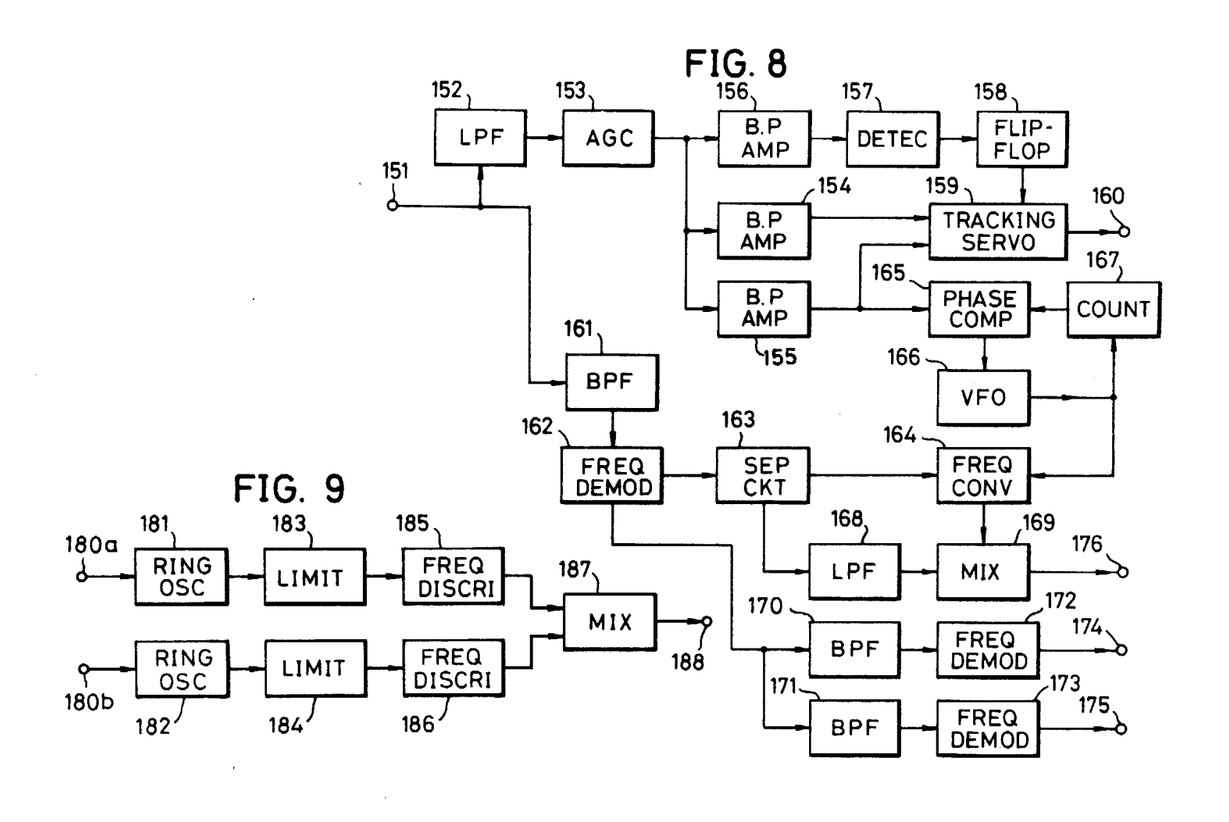
FIG. 8 is a block diagram of one embodiment of the reproducing system of the invention.
FIG. 9 is a block diagram of one embodiment of a time-axis error correction circuit.

Next, the block diagram of one embodiment of the reproducing system of the invention will be described in conjunction with FIG. 8. The stylus 120 reproduces a signal from the disc 110 responsive to a variation of electrostatic capacitance. The signal from the reproducing stylus 120 is passed through a pre-amplifier having a resonance circuit whose resonance frequency varies in response to the variation of electrostatic capacitance. Then the signal is applied to an input terminal 151 of this reproducing system. The reproduced signal thus introduced through the input terminal 151 is fed to a low-pass filter 152 and to a band-pass filter 161.

The first, second, and third pilot signals $f_{p1}$, $f_{p2}$, and $f_{p3}$ are obtained from the low-pass filter 152 and are supplied to an automatic gain control (AGC) circuit 153. There their levels are adjusted to specific values, and are then supplied to amplifiers 154, 155, and 156. These amplifiers 154, 155, and 156 are a kind of band-pass amplifiers having steep tuning frequency characteristics at only the frequencies of the pilot signals $f_{p1}$, $f_{p2}$, and $f_{p3}$, respectively. The first and second pilot signals $f_{p1}$ and $f_{p2}$ are obtained from the amplifiers 154 and 155 and are supplied to a tracking servo circuit 159.

The third pilot signal $f_{p3}$ is obtained from the amplifier 156 and is passed through a detection circuit 157 to trigger a flip-flop circuit 158. The output of flip-flop circuit 158 is a rectangular wave which repeats a logical "0" and "1" with a phase such that the pilot signal $f_{p3}$ exists every revolution of the disc 110. The output signal of the flip-flop circuit 158 is supplied to the tracking servo circuit 159 and switches the polarities of the first and second pilot signals $f_{p1}$ and $f_{p2}$. The output of the tracking servo circuit 159 produces a tracking control signal responsive to the difference between the levels of the first and second pilot signals thus switched. This control signal is led out through terminal 160 and applied to the terminals 138a and 138b of the system shown in FIG. 7.

On the other hand, the main information signal component from the band-pass filter 161, where the pilot signals have been removed, is demodulated by a frequency-demodulation circuit 162. The resulting demodulated signal has frequency-modulated audio signals $f_{A1}$ and $f_{A2}$. The low-band converted carrier chrominance signal, and the band-limited luminance signal are mutually superimposed. This demodulated signal is supplied to a separation circuit 163, where the low-band converted carrier chrominance signal and the luminance signal are separated out.

The separated low-band converted carrier chrominance signal is supplied to a frequency converting circuit 164. There a component of a beat signal is removed. The beat difference is relative to a signal of a frequency 12/7 fsc produced from a signal of a frequency of 5/7 fsc from a variable-frequency oscillator (VFO) 166. The carrier chrominance signal is frequency converted into the original carrier chrominance signal whose color sub-carrier frequency is fsc. The output signal of the frequency 5/7 fsc of the VFO 166 is supplied to a counter 167. There its frequency is counted down by 1/5 and made into a frequency of 1/7 fsc, and is then supplied to a phase comparator 165. The second pilot signal of the frequency of 1/7 fsc from the amplifier 155 is supplied to this phase comparator 165 and is phase compared with the signal from the counter 167. The output phase-compared error signal is applied to the VFO 166 to control the oscillation frequency thereof. As a result, the jitter component is removed from the carrier chrominance signal during the frequency conversion.

The luminance signal separated at the separation circuit 163 is supplied, through a low-pass filter 168 having an upper cut-off frequency of approximately 3 MHz, to a mixer 169. There, it is mixed with the carrier chrominance signal obtained from the frequency converting circuit 164. The reproduced color video signal obtained from the mixer 169 is derived from an output terminal 169.

The output signal of the demodulator 162 is supplied to band-pass filters 170 and 171 in which the frequency modulated audio signals $f_{A1}$ and $f_{A2}$ are filtered out. The frequency modulated audio signals are demodulated at frequency demodulators 172 and 173, whereby the demodulated audio signals are derived from output terminals 174 and 175.

If the pilot signals $f_{p1}$ and $f_{p2}$ are continuously recorded not only in the horizontal blanking period but also in other periods of the video signal, it is possible to perform jitter correction with the reproduced reference signal. In this case, the system shown by the block diagram of FIG. 9 may be added to the block system of FIG. 8.

The first and second pilot signals $f_{p1}$ and $f_{p2}$ are obtained from the amplifiers 154 and 155, respectively, and are supplied through input terminals 180a and 180b to ringing oscillators 181 and 182 which form them into continuous wave signals. The resulting output signals are supplied through amplitude limiters 183 and 184 to frequency discriminators 185 and 186 and frequency discriminated thereat. The discriminated signals are mixed at a mixer 187 having an output terminal 188. The output signal is supplied as a control signal to a known jitter correction mechanism (not shown) called an arm-stretcher. The jitter correction mechanism slightly moves the reproducing stylus 120 in a longitudinal direction along the length of the track in response to the control signal. This movement prevents the time-axis error from occurring in the reproduced signal.

In the above described embodiment, the NTSC system color video signal is employed as the color video signal to be recorded. The frequencies of the pilot signals are selected in accordance with the carrier chrominance signal of the NTSC system color video signal. However, the PAL system or SECAM system color video signal may be employed. In this case, frequencies of the pilot signals may be selected in accordance with these color video signal systems.

The systems according to the present invention may be adopted in a magnetic recording and/or reproducing system.

Further, this invention is not limited to these embodiments. Variations and modifications may be made without departing from the scope of the invention.

What is claimed is:

1. A recording system for recording an information signal on a recording medium which is to be reproduced by a reproducing system, said recording system comprising:
    means for separating a color video signal into a luminance signal and a carrier chrominance signal in which a color sub-carrier is modulated by chrominance components;
a low-pass filtering means for limiting a frequency band of the separated luminance signal;
means for converting the frequency of the separated carrier chrominance signal into a lower frequency band, said converting means converting said carrier chrominance signal to a frequency band which is within but near the upper frequency limit of the limited frequency band of the luminance signal;
a first frequency modulating means for frequency modulating a carrier with at least one audio signal, the audio signal being frequency modulated to be above the limited frequency band of the luminance signal;
means for mixing the separated luminance signal, the frequency converted carrier chrominance signal, and the frequency modulated audio signal;
a second frequency modulating means for frequency modulating a carrier with the mixed signals; and
means for recording the output signal of the second frequency modulating means as a main information signal on a main information signal track of the recording medium.

2. A recording system as claimed in claim 1 in which said separating means comprises a first comb filter for separating the carrier chrominance signal from the color video signal and a second comb filter for separating the luminance signal, which separated signals are removed from the color video signal, the bands of said comb filter corresponding to bands of the separated and frequency converted carrier chrominance signal.

3. A recording system as claimed in claim 1 which further comprises means for generating a signal of a frequency fsc which is equal to the color sub-carrier frequency of the separated carrier chrominance signal, and in which the frequency converting means performs frequency conversion with a signal for frequency conversion obtained from the signal of frequency fsc.

4. A recording system as claimed in claim 1 which further comprises means for generating a signal of a frequency fsc which is equal to a color sub-carrier frequency of the separated carrier chrominance signal, and means for generating at least one reference signal from the signal of a frequency fsc, and in which the recording means records the reference signal at an intermediate position between longitudinal center lines of adjacent main information signal tracks.

5. A recording system as claimed in claim 4 in which said reference signal generating means generates the reference signal having a frequency which interleaves with the frequency of the horizontal synchronizing signal frequency of the video signal from the signal of frequency fsc.

6. A system for reproducing the recording medium recorded by the recording system of claim 4, said reproducing system comprising:
means for reproducing from the recording medium the recorded main information signal and reference signal;
means for separating the reproduced signal into the main information signal and the reference signal;
a first demodulating means for frequency demodulating the separated main information signal;
means for separating the output signal of the first demodulating means into the luminance signal and the frequency converted carrier chrominance signal;
means for covering the separated frequency converted carrier chrominance signal back into the original frequency;
means for mixing the frequency converted carrier chrominance signal with the separated luminance signal thereby obtaining a reproduced color signal;
means for separating the frequency modulated audio signal from the output signal of the first demodulating means;
a second demodulating means for frequency demodulating the separated frequency modulated audio signal; and
means for obtaining from the separated reference signal a control signal for controlling a tracking of the reproducing means on the main information signal track of the recording medium.

7. A reproducing system as claimed in claim 6 which further comprises means for generating an oscillating frequency signal for frequency conversion to the original frequency, and means for comparing the phases of the output signal of the oscillating means and the separated reference signal for producing an output error signal and for controlling the oscillation of the oscillating means responsive to the output error signal.

8. A reproducing system for reproducing a recording medium having a main information signal recorded thereon, said main information signal being a signal in which a carrier is frequency modulated by mixed signals of a luminance signal separated from a color video signal and band-limited, a chrominance signal separated from the color video signal and frequency converted to a frequency band which is within but near the upper frequency limit of the limited frequency band of the luminance signal, and a frequency modulated audio signal in which a carrier is frequency modulated by at least one audio signal to be above the limited frequency band of the luminance signal, said reproducing system comprising:
means for reproducing the recorded main information signal from the recording medium;
a first demodulating means for frequency demodulating the reproduced main information signal;
means for separating the output signal of the first demodulating means into the luminance signal and the frequency converted carrier chrominance signal;
means for frequency converting the separated frequency converted carrier chrominance signal back into its original frequency;
means for mixing the frequency converted carrier chrominance signal with the separated luminance signal thereby obtaining a reproduced color video signal;
means for separating the frequency modulated audio signal from the output signal of the first demodulating means; and
a second demodulating means for frequency demodulating the separated frequency modulated audio signal.

* * * * *